United States Patent
Ro et al.

(10) Patent No.: US 10,446,806 B2
(45) Date of Patent: Oct. 15, 2019

(54) BATTERY PACK HAVING ADJACENT BATTERY CELLS CONNECTED WITHOUT WELDING

(71) Applicant: SAMSUNG SDI CO., LTD., Yongin-si, Gyeonggi-do (KR)

(72) Inventors: Huntae Ro, Yongin-si (KR); Daepyo Lee, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 338 days.

(21) Appl. No.: 14/994,174

(22) Filed: Jan. 13, 2016

(65) Prior Publication Data

US 2016/0240825 A1    Aug. 18, 2016

(30) Foreign Application Priority Data

Feb. 16, 2015 (KR) .......................... 10-2015-0023427

(51) Int. Cl.
| | |
|---|---|
| *H01M 2/06* | (2006.01) |
| *H01M 2/30* | (2006.01) |
| *H01M 2/04* | (2006.01) |
| *H01M 2/02* | (2006.01) |
| *H01M 10/0525* | (2010.01) |

(52) U.S. Cl.
CPC ............. *H01M 2/06* (2013.01); *H01M 2/022* (2013.01); *H01M 2/0404* (2013.01); *H01M 2/30* (2013.01); *H01M 10/0525* (2013.01); *H01M 2220/30* (2013.01)

(58) Field of Classification Search
CPC .......... H01M 2/06; H01M 2/30; H01M 2/022; H01M 2/0404; H01M 10/0525; H01M 2220/30
USPC ........................................................... 429/94
See application file for complete search history.

(56) References Cited

U.S. PATENT DOCUMENTS

| | | | |
|---|---|---|---|
| 2007/0184342 A1* | 8/2007 | Kawano | ............... H01M 2/0413 429/158 |
| 2008/0182168 A1* | 7/2008 | Byun | .................... H01M 2/204 429/158 |

FOREIGN PATENT DOCUMENTS

| | | |
|---|---|---|
| JP | 2005-310419 A | 11/2005 |
| KR | 10-2008-0071764 A | 8/2008 |

\* cited by examiner

*Primary Examiner* — Gary D Harris
(74) *Attorney, Agent, or Firm* — Lee & Morse, P.C.

(57) ABSTRACT

A battery pack includes a battery cell including an electrode assembly including a first electrode plate, a second electrode plate, and a separator that are wrapped, a case that receives the electrode assembly, a cap assembly including a cap up located on an upper part of the case and coupled to the case to be electrically connected to the electrode assembly, a first connection member electrically connected to the cap up of the battery cell, a joining portion on one area of an outer surface of the case, and a second connection member electrically connected to the joining portion at the one area of the outer surface of the case.

11 Claims, 6 Drawing Sheets

BATTERY PACK HAVING ADJACENT BATTERY CELLS CONNECTED WITHOUT WELDING

CROSS-REFERENCE TO RELATED APPLICATION

Korean Patent Application No. 10-2015-0023427, filed on Feb. 16, 2015, in the Korean Intellectual Property Office, and entitled: "Battery Pack," is incorporated by reference herein in its entirety.

BACKGROUND

1. Field

Embodiments relate to a battery pack.

2. Description of the Related Art

Much development of secondary batteries is occurring because the secondary batteries have advantages of being rechargeable, being small and having mass storage capability. Use of the secondary batteries is rapidly on the rise. Among the secondary batteries, a lithium ion battery, which uses a lithium ion with an electrode active material, can be divided into a can type and a pouch type depending on the shape of a container that receives an electrode assembly.

In the lithium secondary battery of a can type, the electrode assembly may be mounted in a can formed of a metal containing aluminum or the like. Generally, a liquid electrolyte may be used in a secondary battery structure of the can type.

SUMMARY

Embodiments are directed to a battery pack including a battery cell including an electrode assembly including a first electrode plate, a second electrode plate, and a separator that are wrapped, a case that receives the electrode assembly, a cap assembly including a cap up located on an upper part of the case and coupled to the case to be electrically connected to the electrode assembly, a first connection member electrically connected to the cap up of the battery cell, a joining portion on one area of an outer surface of the case, and a second connection member electrically connected to the joining portion at the one area of the outer surface of the case.

The joining portion may be in a shape of a screw.

The second connection member may include a first coupling portion in a shape of a nut that is coupleable to the joining portion and a first connection portion extending perpendicularly to a length direction of the case, the first connection portion including separate portions extending in opposite directions from opposite sides of a lower part of the first coupling portion.

The case and the second connection member may be a single body.

The case and the second connection member may be an integral structure formed by insert injection.

The joining portion may include a projecting portion, the projecting portion extending from the joining portion.

The second connection member may include a groove, the groove being in the second connection member at a location corresponding to the projecting portion of the joining portion.

The second connection member may be joined with the joining portion by tight fitting.

The first connection member may have a shape of a leaf spring and may be electrically connected to the cap up.

The first connection member may include an insertion hole in one area of the first connection member. The cap up may include a fixed groove. The first connection member and the cap up may be electrically connected by a fixing member inserted in the inserted in the insertion hole and the fixed groove.

The fixing member includes a screw.

The first connection member may include a second coupling portion in a shape of a nut. A second connection portion extends perpendicularly to a length direction of the case, the second connection portion including separate portions extending in opposite directions from opposite sides of the second coupling portion.

The cap up may include a protruding portion in a shape of a screw at a location that corresponds to the second coupling portion. The second coupling portion may be joined with the protruding portion.

The battery pack may further include an insulating member along a periphery of an upper surface of the cap up, the insulating member extending upwardly from the cap up to a predetermined height.

The cap up may be positive in polarity, and the case may be negative in polarity.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
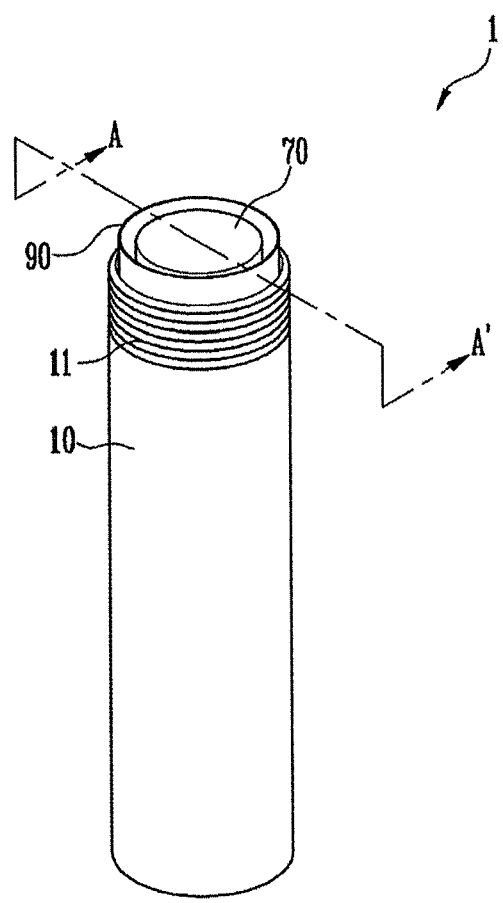
FIG. 1 illustrates a perspective view depicting a battery cell.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

In addition, it will be understood that when an element is referred to as being "connected to" or "coupled to" another element, it may be directly connected or coupled to the other element or intervening elements may be present. In contrast, when an element is referred to as being "directly connected to" or "directly coupled to" another element, there are no intervening elements present.

Spatially relative terms, such as "lower", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Unless otherwise defined, all terms (including technical and scientific terms) used herein have the same meaning as commonly understood by one of ordinary skill in the relevant art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
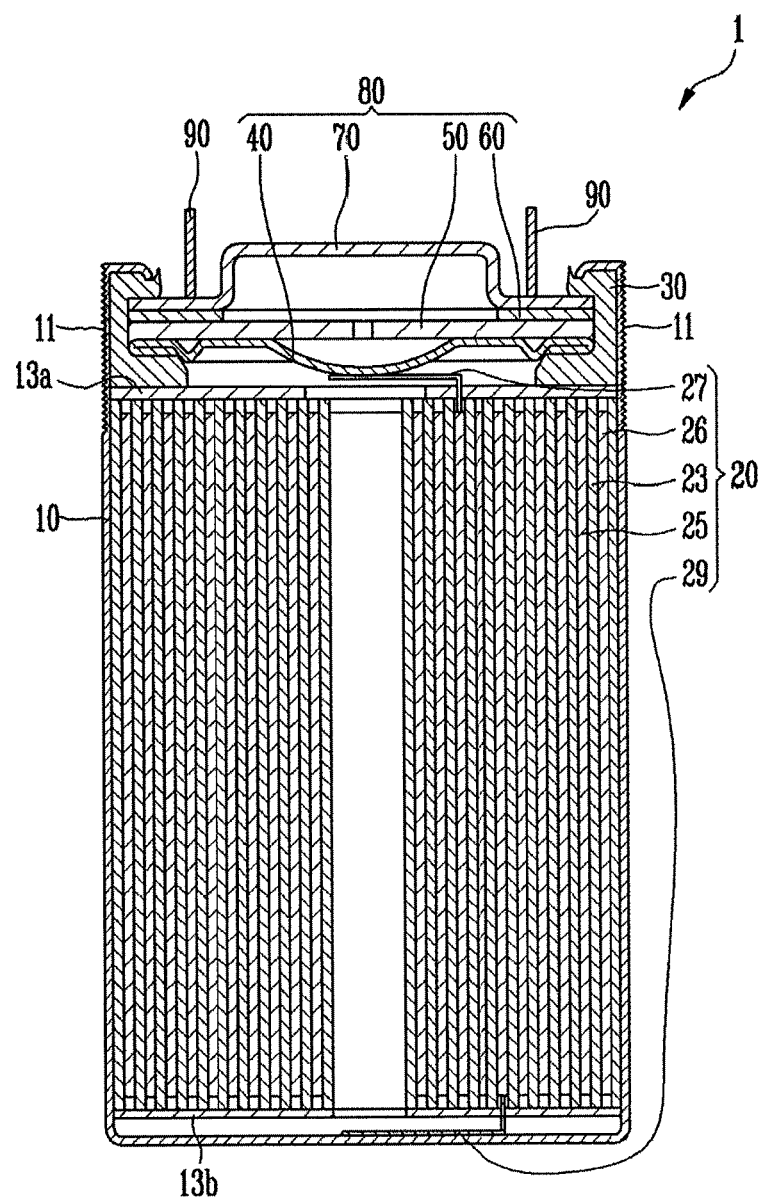
FIG. 2 illustrates a cross-sectional view along A-A' in FIG. 1.

FIG. 1 illustrates a perspective view depicting a battery cell. FIG. 2 illustrates a cross section along A-A' in FIG. 1.

Figure 3A:
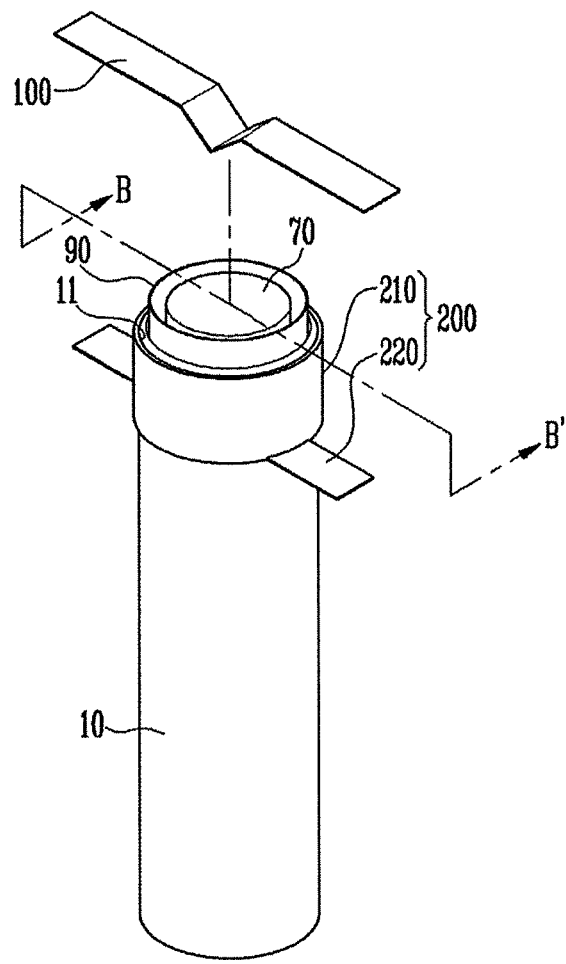
FIG. 3A illustrates a partially exploded view of a coupled state wherein a connection member is coupled to a battery cell to assemble a battery pack according to an embodiment.

Referring to FIGS. 1 and 2, a battery pack may include a battery cell 1, a first connection member 100 (refer to FIG. 3A) and a second connection member 200 (refer to FIG. 3A). The battery cell 1 may include an electrode assembly 20 including wrapped first electrode plate 25, second electrode plate 26, and separator 23, and a case 10 that receives the electrode assembly 20. The case 10 may be a cylindrical case. The battery pack may further include a cap up 70 located on an upper portion of the case 10 and a cap assembly 80 coupled to the case 10 to be electrically connected to the electrode assembly 20. A joining portion 11 may be formed in one area of an outer surface of the case 10 of the battery cell 1.

The first connection member 100 may be electrically connected to the cap up 70 of the battery cell 1. The second connection member 200 may be coupled to the joining portion 11. The joining portion 11 may be formed in the shape of a screw. For example, the joining portion 11 may have outwardly-facing screw threads. The joining portion 11 may electrically connect adjacent ones of the battery cells 1, as will be described with reference to FIGS. 3A to 6. Accordingly, welding between the battery cell 1 and the second connection member 200 may be omitted.

Referring to FIGS. 1 and 2, the battery cell 1 may include the first electrode plate 25 and the second electrode plate 26, which are initially formed in the shape of a flat plate with the separator 23 interposed between the first electrode plate 25 and the second electrode plate 26. The separator 23 may help to prevent a short circuit between the first electrode plate 25 and the second electrode plate 26. After the first electrode plate 25, the separator 23 and the second electrode plate 26 are sequentially stacked, the first electrode plate 25, the separator 23 and the second electrode plate 26 may be wound to make up an electrode assembly 20, in a configuration that is commonly referred to as a "jelly roll."

The first electrode plate 25 and the second electrode plate 26 may be formed by applying an active material slurry on a current collector made of a metal foil. An uncoated region, where no slurry is applied, may exist at a start portion and at an edge portion of a current collector in a direction in which the first electrode plate 25 and the second electrode plate 26 are coiled. A first electrode tab 27 and a second electrode tab 29 may be attached at respective uncoated regions of the first electrode plate 25 and the second electrode plate 26. The first electrode tab 27 and the second electrode tab 29 may form a portion of a path to connect the electrode assembly 20 and an external circuit. One of the first electrode tab 27 and the second electrode tab 29 may be electrically connected to the case 10 and the other of the first electrode tab 27 and the second electrode tab 29 may be electrically connected to the cap assembly 80, which is insulated from the case 10. For example, in the electrode assembly 20, the first electrode tab 27 may be drawn towards an upper part of the case 10 in a direction of an opening in the case, and the second electrode tab 29 may be drawn towards a lower part of the case 10.

The electrode assembly 20, along with upper and lower insulating plates 13A and 13B located at upper and lower parts, respectively, may be sequentially inserted into the case 10 through the opening of the case 10. An electrolyte may be injected inside the case 10. An insulating gasket 30 may be installed on an inner wall of the opening of the case 10. A cap assembly 80 that seals the opening of the case 10 may be installed towards an inside of the gasket 30.

The cap assembly 80 may include a stacked structure including, sequentially stacked, a vent 40 that is connected to the first electrode tab 27, the vent 40 having a shape that is reversable when the battery is overcharged, a printed circuit board 50 installed such that when the vent 40 is reversed, a circuit is disconnected, and a cap up 70 coupled to an external terminal including a positive thermal coefficient (PTC) portion 60 to which current is applied. The PTC portion 60 disconnects a circuit if a temperature reaches a certain temperature or higher.

The cap up 70 and the case 10 may have opposite polarities. For example, the cap up 70 may be positive, and the case 10 may be negative.

The case 10 may be sealed, using the cap up 70, or the like, placed inside the gasket 30 as a stopper, by applying pressure to inside and to the lower part of walls of the opening of the case 10. An outer surface of the case 10 may be negative. A tubing process may be omitted.

For convenience of welding between the first electrode tab 27 and the vent 40 at an upper part of the electrode assembly 20, the first electrode tab 27 may be formed to have spare length. The cap assembly 80 may be positioned inside the opening of the case 10 after the first electrode tab 27 is bent and is welded to the vent 40.

An insulating member 90 may extend upwardly from the cap up 70 to a predetermined height. The insulating member 90 may extend upwardly from an upper surface of the cap up 70 along a circumference or periphery of the cap up 70. The insulating member 90 may prevent the cap up 70, which may be positive in polarity, and the case 10, which may be negative in polarity, from being short circuited as the battery pack is implemented.

Figure 3B:
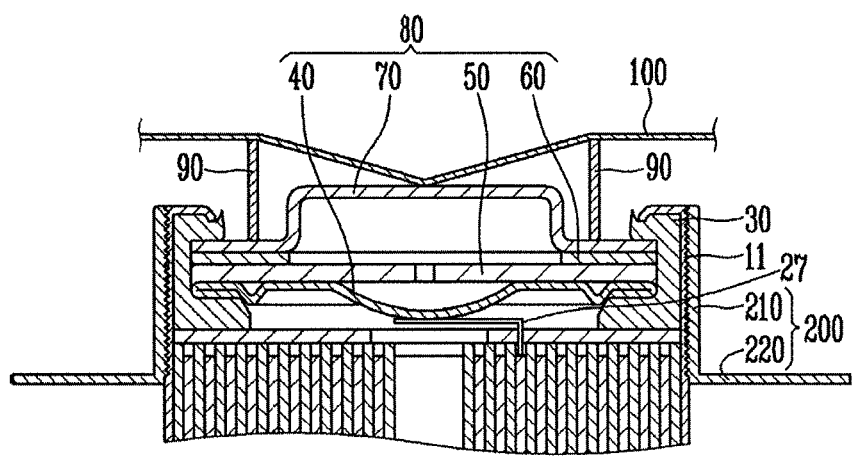
FIG. 3B illustrates a cross-sectional view of the coupled state along B-B' in FIG. 3A.

FIG. 3A illustrates a partially exploded view of a coupled state wherein a connection member is coupled to a battery cell to assemble a battery pack according to an embodiment. FIG. 3B illustrates a cross-sectional view of the coupled state along B-B' in FIG. 3A.

Referring to FIGS. 3A and 3B, a battery cell may be cylindrical. A joining portion 11 may be formed in one area of an outer surface of a case 10 of the battery cell. The joining portion 11 may be positioned on an upper part of the case 10. The cap up 70, which is exposed to outside of the cap assembly 80 that seals the opening of the case 10, may be positive in polarity, and the case 10 may be negative. The first connection member 100 may be connected to the cap up 70. The second connection member 200 may be connected to the joining portion 11 of the case 10. The first connection member 100 and the second connection member 200 may electrically connect adjacent ones of the battery cell 1.

The first connection member 100 may be formed in the shape of a leaf spring and may be electrically connected to the cap up 70. The electrode terminal may be formed convexly upward such that the cap up 70 is electrically connected to an external device or adjacent battery cell. When the first connection member 100 is connected to the electrode terminal of the cap up 70, the battery and the external device, or adjacent battery cells may be electrically connected.

The joining portion 11 formed on the upper part of the case 10 may be formed in the shape of a screw. For example, the joining portion 11 may have outwardly-facing screw threads. The second connection member 200 may include a first coupling portion 210 and a first connection portion 220. The first coupling portion 210 may be formed in the shape of a nut to be coupled to the joining portion 11. For example, the first coupling portion 210 may include inwardly-facing screw threads that are screw-coupleable with the outwardly-facing screw threads of the joining portion. The first connection portion 220 may extend perpendicularly to a length direction of the length of the case 10. For example, the connection portion 220 may include separate portions extending in opposite directions from opposite sides of a lower part of the first coupling portion 210. The first coupling portion 210 may be fixed to the case 10 when the first coupling portion 210 is joined by screw-coupling to the joining portion 11. The first connection portion 220 may be electrically connected to an external device or to adjacent battery cells.

When the joining portion 11 that joins the second connection member 200 to an outer surface of the battery cell is formed, processes for welding and tubing of the battery cell may be omitted. When the joining portion 11 is formed in one area of the battery cell, it may be relatively easy to manufacture a battery pack, a battery cell may be replaced in the battery pack even after the battery pack has been assembled.

As illustrated in FIG. 3B, the case 10 and the second connection member 200 may be separately formed and joined by means of screw-coupling. In other implementations, the case 10 and the second connection member 200 may be formed as a single body by insert-injection.

Figure 4A:
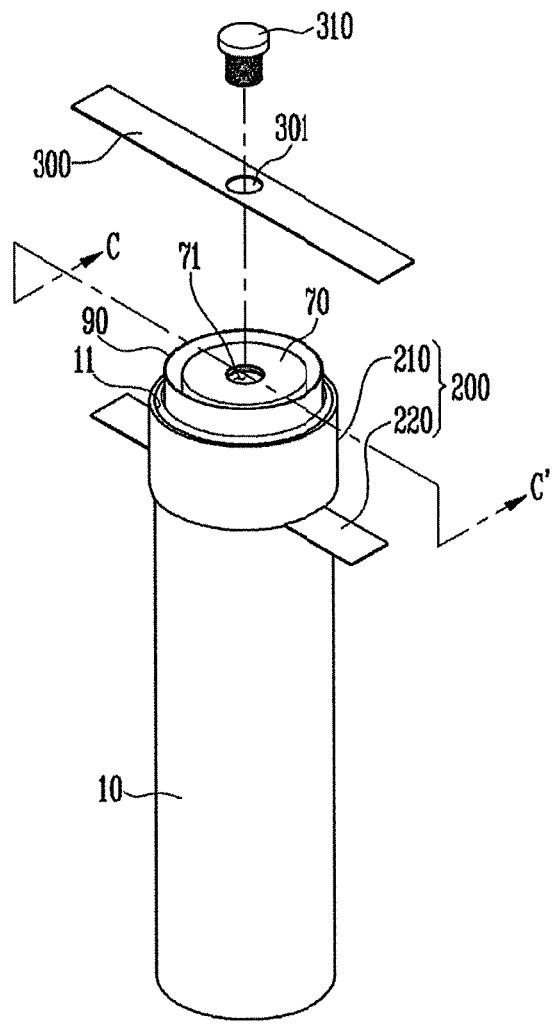
FIG. 4A illustrates a partially exploded view of a coupled state wherein a connection member is coupled to a battery cell to assemble a battery pack according to another embodiment.
Figure 4B:
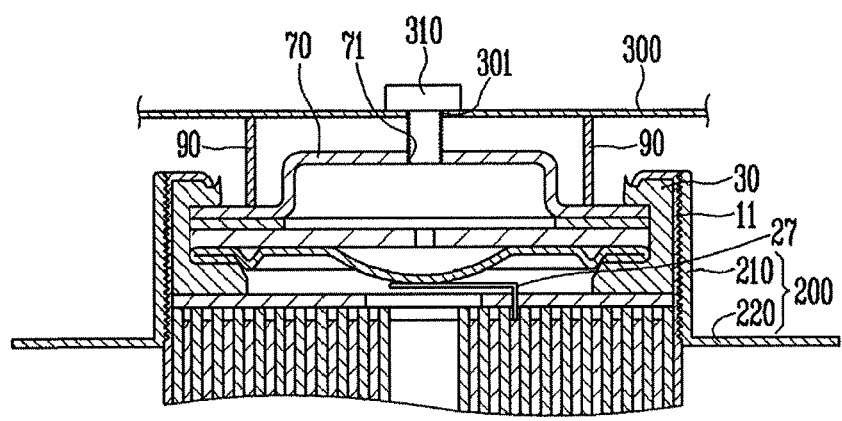
FIG. 4B illustrates a cross-sectional view of the coupled state along C-C' in FIG. 4A.

FIG. 4A illustrates a partially exploded view of a coupled state wherein a connection member is coupled to a battery cell to assemble a battery pack according to another embodiment. FIG. 4B is a cross-sectional view of the coupled state along C-C' in FIG. 4A.

Referring to FIGS. 4A and 4B, the joining portion 11 in the shape of a screw may be formed in one area of an outer surface of a case 10 of a battery cell, similar to the previous embodiment. The second connection member 200 that includes the first coupling portion 210 and the first connection portion 220 may be coupled to the battery cell at the joining portion 11. The first coupling portion 210 may be formed in the shape of a nut to be coupled to the joining portion 11 of the case 10. The first connection portion 220 may extend perpendicularly to a length direction of the case 10. For example, the connection portion 220 may extend in opposite directions from opposite sides of the lower part of the first coupling portion 210.

In this embodiment, an insertion hole 301 may be formed in one area of the first connection member 300. A fixed groove 71 may be formed in the cap up 70 at a location that corresponds to the insertion hole 301. A separate fixing member 310 may be inserted in the insertion hole 301 and the fixed groove 71 such that the first connection member 300 and the cap up 70 are electrically connected to each other.

The fixing member 310 may include a screw. For example, the fixing member may include outwardly facing screw threads. An inside of the fixed groove 71 may be formed in the shape of a nut corresponding to the screw such that the screw may be inserted and fixed. For example, the fixed groove 71 may include inwardly-facing screw threads that are screw-coupleable with the outwardly facing screw threads of the fixing member 310.

The first connection member 300 may be formed in the shape of a strip that includes the insertion hole 301. The fixed groove 71 may be formed at the cap up 70 corresponding to the insertion hole 301. The first connection member 300 and the cap up 70 may be connected using the fixing member 310 that passes through the insertion hole 301 and the fixed groove 71. The first connection member 300 may be supported by the upper part of the insulating member 90 formed along a periphery of one area of the cap up 70. Accordingly, insulation between the first connection member and the case 10 may be maintained.

Figure 5A:
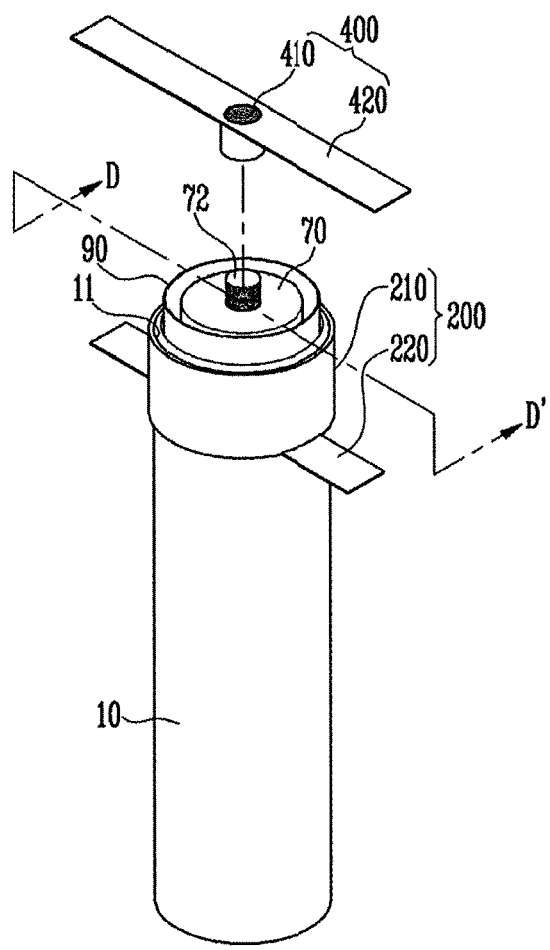
FIG. 5A illustrates a partially exploded view of a coupled state wherein a connection member is coupled to a battery cell to assemble a battery pack according to another embodiment.
Figure 5B:
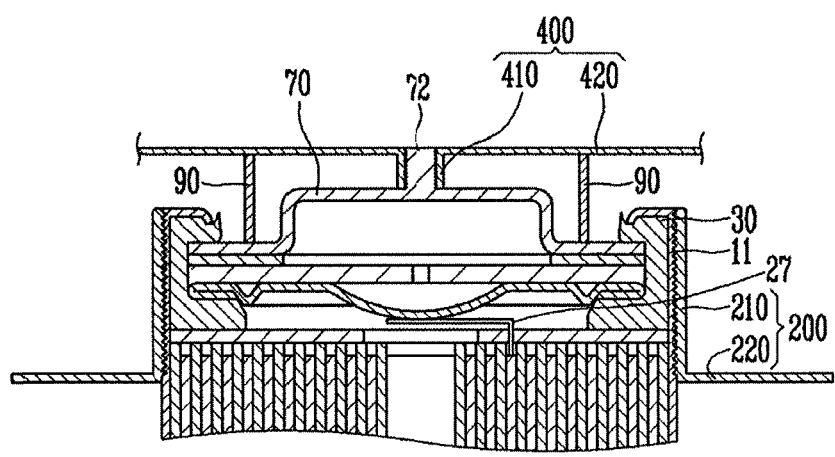
FIG. 5B illustrates a cross-sectional view of the coupled state along D-D' in FIG. 5A.

FIG. 5A illustrates a partially exploded view of a coupled state where a connection member is coupled to a battery cell to assemble a battery pack according to another embodiment. FIG. 5B is a cross-sectional view of the coupled state along D-D' in FIG. 5A.

Referring to FIGS. 5A and 5B, the joining portion 11 in the shape of a screw may be formed in one area of an outer surface of a case 10 of a battery cell, similar to the previous embodiments. The second connection member 200 including a first coupling portion 210 and a first connection portion 220 may be coupled to the battery cell at the joining portion 11. The first coupling portion 210 may be formed in the shape of a nut to be coupled to the joining portion 110 of the case 10, and the first connection portion 220 may extend perpendicularly to length a direction of the case 10. For example, the connection portion 220 may extend in opposite directions from opposite sides of the lower part of the first coupling portion 210.

The first connection member 400 may include a second coupling portion 410 and a second connection portion 420. The second coupling portion 410 may be formed in the shape of a nut. The second connection portion 420 may extend perpendicularly to a length direction of the case 10 in opposite directions from opposite sides of an upper part of the second coupling portion 410.

A protruding portion 72 in the form of a screw may protrude from the cap up 70 at a location corresponding to the second coupling portion 410. When the second coupling portion 410 is joined to the protruding portion 72, the cap up 70 and the first connection member 400 may be electrically connected. The second connection portion 420 is supported by an upper part of the insulating member 90 formed along a periphery of one area of the cap up 70 such that insulation between the first connection member 400 and the case 10 may be maintained.

Figure 6:
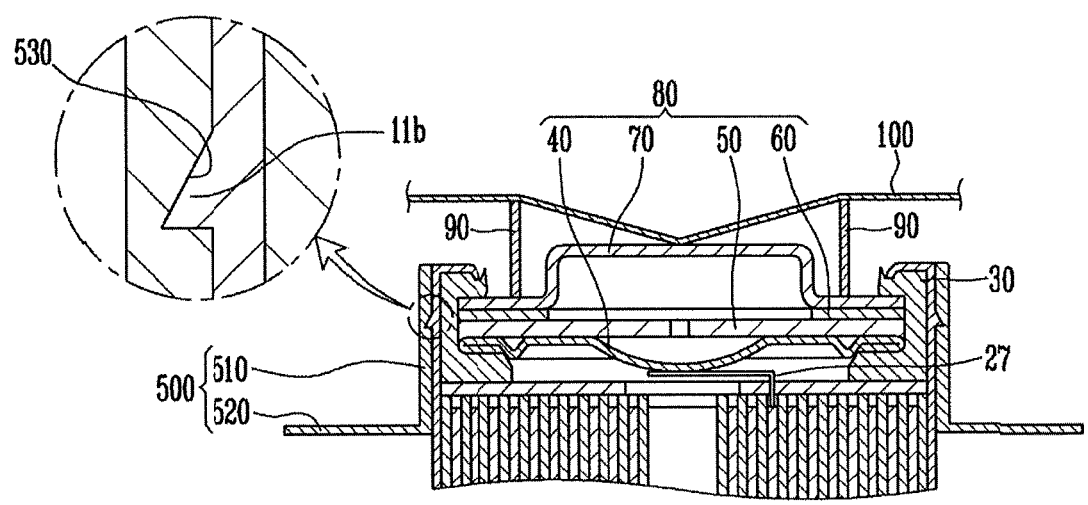
FIG. 6 illustrates a cross-sectional view depicting a battery pack according to another embodiment.

FIG. 6 illustrates a cross-sectional view depicting a battery pack according to another embodiment.

Referring to FIG. 6, a first connection member 100 may be formed in the shape of a leaf spring, similar to the embodiment illustrated in FIG. 3B, and may be electrically connected to a cap up 70. The cap up 70 may include an electrode terminal, which may be formed convexly towards an upper part to be electrically connected to an external device or an adjacent battery cell. When the first connection member 100 is connected to the electrode terminal of the cap up 70, the battery cell and an external device, or adjacent battery cells may be electrically connected.

A second connection member 500 may be coupled to a joining portion formed in one area of an outer surface of a case 10 of the battery cell. In this embodiment, the joining portion may be a projecting portion 11b that protrudes from an outer surface of the case 10. The projecting portion 11b may be formed in the shape of a hook. The second connection member 500 may be coupled to the joining portion including the projecting portion 11b formed in the shape of a hook. The second connection member 500 may include a third coupling portion 510 and a third connection portion 520. The third coupling portion 510 may surround a joining portion of an outer surface of the case 10 and may include a groove 530 receiving the projecting portion 11b in an inner surface of the third coupling portion 510 at a position corresponding to the projection portion 11b. The third connection portion 520 may extend perpendicularly to a length direction of the length of the case 10. For example, the connection portion 520 may extend in opposite directions from opposite of a lower part of the third coupling portion 510.

The second connection member 500 may be coupled to the joining portion of the outer surface of the case 10 due to the projecting portion 11b and the groove 530. The adjacent battery cells may be electrically connected without welding. Accordingly, the process for manufacturing a battery pack may be made easier, and a battery cell may be replaceable after a battery pack has been assembled.

In the this embodiment, the second connection member 500 is fixed to the case 10 when the projecting portion 11b of the joining portion and the groove 530 of the second connection member 500 are joined. Accordingly, the case 10 and the second connection member 500 may be coupled to each other by tight fitting without any additional structure.

By way of summation and review, a secondary battery of the can type may be further divided into a quadrilateral battery and a cylindrical battery. The quadrilateral battery may be thinly shaped by shaping the container into a parallelepiped shape, and may be used in electronic devices such as mobile phones. The cylindrical battery may be used in electronic devices of relatively high capacity. A plurality of the cylindrical secondary batteries may be coupled to each other to form a battery pack.

Embodiments provide a battery pack having improved safety.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery pack, comprising:
   a battery cell, including:
      an electrode assembly including a first electrode plate, a second electrode plate, and a separator between the first and second electrode plates,
      a metal case that receives the electrode assembly, an outer surface of the metal case including a joining portion having a same polarity as the metal case, wherein the joining portion encircles the outer surface of the metal case, and
      a cap assembly including a cap up located on an upper part of the metal case and coupled to the metal case to be electrically connected to the electrode assembly;
   a first connection member electrically connected to the cap up of the battery cell; and
   a second connection member in direct contact with and electrically connected to the joining portion of the outer surface of the metal case, the second connection member having the same polarity as the metal case, wherein:
   the cap up and the first connection member have a first polarity, and the metal case, the joining portion, and the second connection member have a second polarity different from the first polarity,
   wherein the joining portion is a portion of the outer surface of the metal case formed with a screw thread, the second connection member having an inwardly facing screw thread and being joined with the outer surface of the metal case by screw coupling.

2. The battery pack as claimed in claim 1, wherein the inwardly facing screw thread of the second connection member is part of a first coupling portion in a shape of a nut that is coupleable to the joining portion, the second connection member further including a first connection portion extending perpendicularly to a length direction of the metal case, the first connection portion including separate portions extending in opposite directions from opposite sides of a lower part of the first coupling portion.

3. A battery pack, comprising:
   a battery cell, including:
      an electrode assembly including a first electrode plate, a second electrode plate, and a separator between the first and second electrode plates,
      a metal case that receives the electrode assembly, an outer surface of the metal case including a joining portion having a same polarity as the metal case, wherein the joining portion encircles the outer surface of the metal case, and
      a cap assembly including a cap up located on an upper part of the metal case and coupled to the metal case to be electrically connected to the electrode assembly;
   a first connection member electrically connected to the cap up of the battery cell; and
   a second connection member in direct contact with and electrically connected to the joining portion of the outer surface of the metal case, the second connection member having the same polarity as the metal case, wherein:
   the cap up and the first connection member have a first polarity, and the metal case, the joining portion, and the second connection member have a second polarity different from the first polarity, and
   the first connection member has a bent portion protruding toward the cap up, the bent portion being in contact with and electrically connected to an outer surface of the cap up, the first connection member and the cap up having a same polarity.

4. The battery pack as claimed in claim 1, wherein:
the first connection member includes an insertion hole in one area of the first connection member,
the cap up includes a fixed groove, and
the first connection member and the cap up are electrically connected by a fixing member inserted in the insertion hole and the fixed groove.

5. The battery pack as claimed in claim 4, wherein the fixing member includes a screw.

6. A battery pack, comprising:
a battery cell, including:
an electrode assembly including a first electrode plate, a second electrode plate, and a separator between the first and second electrode plates,
a metal case that receives the electrode assembly, an outer surface of the metal case including a joining portion having a same polarity as the metal case, wherein the joining portion encircles the outer surface of the metal case, and
a cap assembly including a cap up located on an upper part of the metal case and coupled to the metal case to be electrically connected to the electrode assembly;
a first connection member electrically connected to the cap up of the battery cell; and
a second connection member in direct contact with and electrically connected to the joining portion of the outer surface of the metal case, the second connection member having the same polarity as the metal case, wherein:
the cap up and the first connection member have a first polarity, and the metal case, the joining portion, and the second connection member have a second polarity different from the first polarity,
the first connection member includes a second coupling portion in a shape of a nut,
a second connection portion extends perpendicularly to a length direction of the metal case, the second connection portion including separate portions extending in opposite directions from opposite sides of the second coupling portion, and
the cap up includes a protruding portion in a shape of a screw at a location that corresponds to the second coupling portion, and the second coupling portion is joined with the protruding portion.

7. The battery pack as claimed in claim 1, further comprising an insulating member along a periphery of an upper surface the cap up, the insulating member extending upwardly from the cap up to a predetermined height.

8. The battery pack as claimed in claim 1, wherein the cap up and the first connection member are positive in polarity, and the metal case, the joining portion, and the second connection member are negative in polarity.

9. The battery pack as claimed in claim 1, wherein the battery cell and an adjacent battery cell are electrically connected by the joining portion.

10. A battery pack, comprising:
a battery cell including an electrode assembly including a first electrode plate, a second electrode plate, and a separator that are wrapped, a case that receives the electrode assembly, a cap assembly including a cap up located on an upper part of the case and coupled to the case to be electrically connected to the electrode assembly;
a first connection member electrically connected to the cap up of the battery cell;
a joining portion on one area of an outer surface of the case; and
a second connection member electrically connected to the joining portion at the one area of the outer surface of the case, wherein:
the first connection member includes a second coupling portion in a shape of a nut,
a second connection portion extends perpendicularly to a length direction of the case, the second connection portion including separate portions extending in opposite directions from opposite sides of the second coupling portion, and
the cap up includes a protruding portion in a shape of a screw at a location that corresponds to the second coupling portion, and the second coupling portion is joined with the protruding portion.

11. A battery pack, comprising:
a battery cell, including:
an electrode assembly including a first electrode plate, a second electrode plate, and a separator between the first and second electrode plates,
a metal case that receives the electrode assembly, an outer surface of the metal case including a joining portion having a same polarity as the metal case, and
a cap assembly including a cap up located on an upper part of the metal case and coupled to the metal case to be electrically connected to the electrode assembly;
a first connection member electrically connected to the cap up of the battery cell; and
a second connection member in direct contact with and electrically connected to the joining portion of the outer surface of the metal case, the second connection member having the same polarity as the metal case,
wherein the joining portion is a portion of the outer surface of the metal case formed with a screw thread, the second connection member having an inwardly facing screw thread and being joined with the outer surface of the metal case by screw coupling.

* * * * *